Aug. 5, 1958 D. R. MADISON Re. 24,511

OUTBOARD MOTOR HAVING TOW LINE DEVICE
AND METHOD FOR TOWING
Original Filed Sept. 17, 1954

INVENTOR.
Darwin R. Madison
BY
Merchant & Merchant
ATTORNEYS

United States Patent Office

Re. 24,511
Reissued Aug. 5, 1958

24,511

OUTBOARD MOTOR HAVING TOW LINE DEVICE AND METHOD FOR TOWING

Darwin R. Madison, Brainerd, Minn.

Original No. 2,764,118, dated September 25, 1956, Serial No. 456,683, September 17, 1954. Application for reissue February 25, 1958, Serial No. 718,109

9 Claims. (Cl. 115—17)

Figure 1:
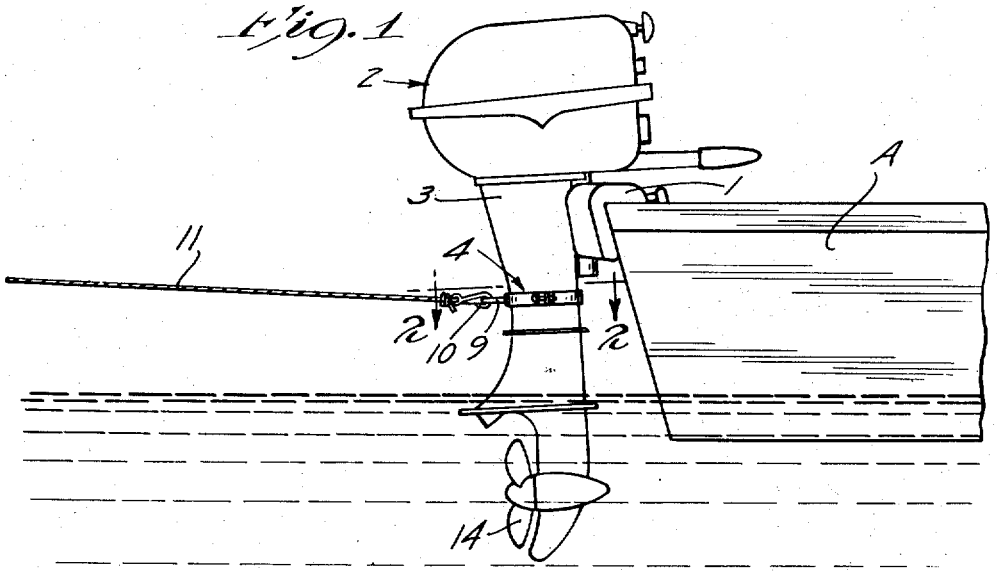

Matter enclosed in heavy brackets [ ] appears in the original patent but forms no part of this reissue specification; matter printed in italics indicates the additions made by reissue.

My invention relates to improvements in outboard marine motors. More specifically, my invention provides a novel tow line attaching means for securing the tow line for use in water skiing, surfboard riding and the like.

The primary object of my invention is to provide a novel tow line attaching means which includes a conventional-type outboard motor pivotally and detachably secured to the transom board of a boat so that when the tow line is secured thereto the forces created in pulling a tow is relieved from the transom of the towing boat and is directed against the drive shaft housing of the motor closely adjacent the longitudinal axis of the propeller of the motor.

A further object of my invention is to provide a novel tow line attaching means, of the type described, which secures a tow line to the drive shaft housing of the conventional-type outboard motor so that the connection is disposed in longitudinally rearwardly spaced relation to and traversely centrally of the boat transom board.

A further object of my invention is to provide a novel tow line attaching means, of the type described, which by specifically locating the connection of the tow line to the drive shaft housing of a conventional outboard motor facilitates the steering of the boat and the maneuvering of the boat controls while under tow.

A further object of my invention is a method of securing a tow to a boat whereby the resultant pull created by the tow is transmitted substantially directly to the propeller of the outboard motor which powers the boat.

More specifically, the objects of my invention comprise in combining with a conventional-type outboard motor a securing means for attaching the tow line directly to the drive shaft housing of the motor so that the connection of the line to the housing is made intermediate the pivotal-detachable connection of the motor to the boat transom and the propeller on the lower end of the drive shaft housing.

A still further object of my invention is to modify existing conventional-type outboard motors in accordance with the inventive concept disclosed herein, by combining with the motor a novel tow rope securing bracket detachably secured to the drive shaft housing of the conventional outboard motor above the water line, but below the horizontal pivotal connection of the outboard motor to the transom-engaging inverted U-shaped clamp thereof.

A still further object of my invention is the provision of a device of the class described which is readily securable to and removable from a drive shaft of a conventional outboard marine motor, which has a minimum of parts, but which is rugged and durable in construction.

A still further object of my invention is the provision of a device of the class described which is provided with a metallic ring or loop for quick reception of a hook-equipped rope or tow cable.

A still further object of my invention is the provision of a fixed tow line securing device, of the class described, which when a tow line is applied to the drive shaft housing of an outboard marine motor, will not tend to move vertically thereof and will not mark or scuff the finish thereon.

From the above recited objects it is apparent that an additional object of my invention is a new and novel method of pulling a tow load by a boat equipped with a conventional outboard motor by securing a tow line directly to the drive shaft housing of the outboard motor intermediate the pivotal connection of the outboard motor to the transom board of the boat and the propeller of the outboard motor so that a material part of the resultant pull which is created by the tow is transmitted substantially directly to the propeller of the motor and not to the boat transom board.

The above and still further objects of my invention will become apparent from the following detailed specification, attached drawing and appended claims.

Figure 2:
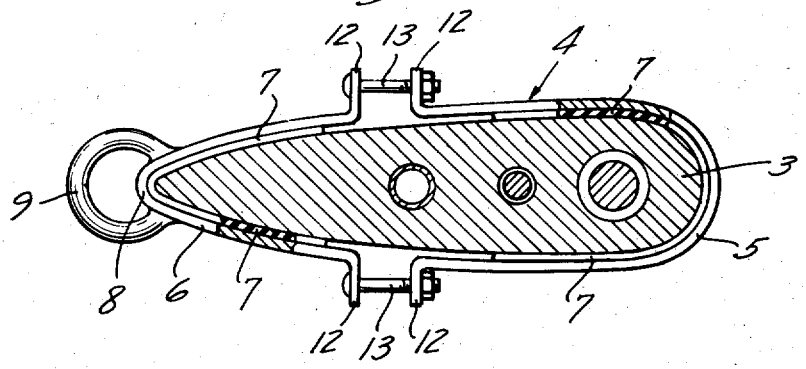

Referring to the drawing, wherein like characters indicate like parts throughout the several views:

Fig. 1 is a view in side elevation of a boat having the improved outboard motor secured thereto; and Fig. 2 is an enlarged view, partly in section and partly in top plan, as seen from line 2—2 of Fig. 1.

Referring with greater particularity to the drawings, the letter A indicates in its entirety a boat, to the transom of which the conventional inverted U-shaped clamping means 1 of the pivotal-type for an outboard motor 2 is secured. The numeral 3 indicates the drive shaft housing of the motor 2, to the reduced intermediate portion of which (above the water line but below the clamp 1) my novel clamping bracket, identified in its entirety by the numeral 4, is secured.

As shown in Fig. 2, my novel device comprises front and rear cooperating U-shaped sections 5 and 6, respectively, which together form a clamping ring. Sections 5 and 6 are preferably formed from sheet steel or the like and, as shown, have rigidly secured, as by vulcanization to their interior surfaces, liners 7 of compressible rubber-like material. The rear section 6 is shown as having rigidly secured to its intermediate portion 8, by welding or the like so as to project horizontally rearwardly therefrom, a metallic loop or ring 9, which as shown, is circular in cross section and has transverse dimensions less than the transverse width of the U-sections 5—6 of the collar and [is] *has a central opening therethrough* adapted to detachably receive a hook or hasp 10 of a tow line 11. Preferably, and as shown, the front and rear clamping sections 5 and 6 have their opposite end portions outturned to provide parallel clamping ears 12, through which nut-equipped clamping bolts 13 are adapted to extend.

When my novel device is applied to the drive shaft housing 3 of an outboard motor, as shown in Fig. 1, the tow rope 11 is completely free from entanglement with the propeller 14. In all other respects, my invention has been found to be completely satisfactory for the accomplishment of the above objects; and while I have disclosed a preferred embodiment thereof, it should be understood that my invention is capable of modification without departure from the scope of the invention as defined in the appended claims.

What I claim is:

1. In an outboard motor having a depending drive shaft housing, propelling means adjacent one end of the housing, pivotal securing means adjacent the other end of the housing for detachably anchoring the motor to a boat transom for rearward upwardly swinging movements of the propelling means equipped end of the housing, the improvement comprising, a tow line attaching means on said housing intermediate the propelling means and pivotal securing means.

2. In an outboard motor having a depending drive shaft housing, propelling means adjacent one end of the housing, pivotal securing means adjacent the other end of the housing for detachably, pivotally anchoring the motor to a boat transom, the improvement comprising, a tow line attaching means on said housing intermediate the propelling means and pivotal securing means and disposed substantially in a vertical plane common to the longitudinal axis of said propelling means.

3. The method of pulling a tow load by a boat having a conventional outboard motor including a propeller equipped drive shaft housing pivotally anchored to the boat transom board, the method comprising securing a tow line directly to the drive shaft housing of the outboard motor intermediate the pivotal connection and the propeller so that a material part of the resultant pull created by the tow is transmitted substantially directly to the propeller of the motor and not to the boat transom board.

*4. The structure defined in claim 1 wherein said tow line attaching means comprises structure having an opening for reception of a part of a tow line.*

*5. The structure defined in claim 1 wherein said tow line attaching means comprises loop-defining structure having an opening therethrough for reception of a part of a tow line.*

*6. The structure defined in claim 2 wherein said tow line attaching means comprises structure having an opening for reception of a part of a tow line.*

*7. The structure defined in claim 2 wherein said tow line attaching means comprises loop-defining structure having an opening therethrough for reception of a part of a tow line.*

*8. In an outboard motor having a depending drive shaft housing, propelling means adjacent one end of the housing, pivotal securing means adjacent the other end of the housing for detachably anchoring the motor to a boat transom for rearward upwardly swinging movements of the propelling means equipped end of the housing, the improvement comprising, in combination with the housing of tow line attaching means on the housing intermediate the propelling means and pivotal securing means, said tow line attaching means comprising a portion extending rearwardly of said housing and defining an opening for reception of part of a tow line.*

*9. An outboard motor having a depending drive shaft housing, propelling means adjacent one end of the housing, pivotal securing means adjacent the other end of the housing for detachably anchoring the motor to a boat transom for rearwardly upwardly swinging movements of the said one end of the housing, and a tow line attaching means on said housing intermediate the propelling means and pivotal securing means, said tow line attaching means comprising cooperating sections detachably secured to each other and surrounding said housing, and a loop-defining structure on one of said sections.*

References Cited in the file of this patent or the original patent

UNITED STATES PATENTS

| | | |
|---|---|---|
| 1,107,408 | Caille | Aug. 18, 1914 |
| 1,928,626 | Lesage | Oct. 3, 1933 |
| 2,140,099 | Wise | Dec. 13, 1938 |
| 2,162,441 | Mead | June 13, 1939 |
| 2,518,816 | Powers | Aug. 15, 1950 |
| 2,612,383 | Manders | Sept. 30, 1952 |